(12) United States Patent
Hall et al.

(10) Patent No.: US 11,036,391 B2
(45) Date of Patent: Jun. 15, 2021

(54) HAPTIC FEEDBACK SYSTEMS AND METHODS FOR AN AMUSEMENT PARK RIDE

(71) Applicant: Universal City Studios LLC, Universal City, CA (US)

(72) Inventors: Gregory S. Hall, Orlando, FL (US); Dante Lamar Bruno, Orlando, FL (US)

(73) Assignee: Universal Studios LLC, Universal City, CA (US)

( * ) Notice: Subject to any disclaimer, the term of this patent is extended or adjusted under 35 U.S.C. 154(b) by 0 days.

(21) Appl. No.: 16/412,041

(22) Filed: May 14, 2019

(65) Prior Publication Data
US 2019/0354282 A1   Nov. 21, 2019

Related U.S. Application Data

(60) Provisional application No. 62/672,285, filed on May 16, 2018.

(51) Int. Cl.

| | |
|---|---|
| *G09G 1/00* | (2006.01) |
| *G06F 3/0488* | (2013.01) |
| *G06F 3/01* | (2006.01) |
| *H04M 1/72427* | (2021.01) |
| *A63G 31/16* | (2006.01) |
| *G06F 3/041* | (2006.01) |
| *A63G 7/00* | (2006.01) |

(52) U.S. Cl.
CPC .......... *G06F 3/04886* (2013.01); *G06F 3/016* (2013.01); *H04M 1/72427* (2021.01); *A63G 7/00* (2013.01); *A63G 31/16* (2013.01); *G06F 3/041* (2013.01); *G06F 2203/013* (2013.01); *G06F 2203/04809* (2013.01)

(58) Field of Classification Search
CPC .. G06T 19/00; G06T 19/20; A63J 5/00; G06F 3/01
See application file for complete search history.

(56) References Cited

U.S. PATENT DOCUMENTS

| | | | |
|---|---|---|---|
| 3,594,787 | A | 7/1971 | Ickes |
| 5,942,970 | A | 8/1999 | Norman |
| 6,712,613 | B2 | 3/2004 | Depta |
| 8,605,141 | B2 | 12/2013 | Dialameh et al. |
| 9,433,870 | B2 | 9/2016 | Blum et al. |

(Continued)

OTHER PUBLICATIONS

PCT/US2019/032714 International Search Report and Written Opinion dated Sep. 12, 2019.

*Primary Examiner* — Michael A Faragalla
(74) *Attorney, Agent, or Firm* — Fletcher Yoder, P.C.

(57) ABSTRACT

An amusement park ride system including a ride vehicle, a ride control system that may track a location of the ride vehicle on a ride path and a haptic feedback system having a screen having a surface modifying component. The surface modifying component may be positioned on the ride vehicle. The haptic feedback system also includes a control system having a memory and a processor. The memory stores instructions that, when executed by the processor, may cause the haptic feedback system to convert data from the ride control system into tactile information representative of scenery surrounding the ride vehicle based on stored scenery data that is correlated to the location.

20 Claims, 7 Drawing Sheets

(56) References Cited

U.S. PATENT DOCUMENTS

| | | |
|---|---|---|
| 9,711,065 B2 | 7/2017 | Yu et al. |
| 9,865,178 B2 | 1/2018 | Hewitt et al. |
| 2008/0138774 A1 | 6/2008 | Ahn et al. |
| 2008/0170118 A1 | 7/2008 | Albertson et al. |
| 2008/0198222 A1 | 8/2008 | Gowda |
| 2010/0192110 A1 | 7/2010 | Carter et al. |
| 2013/0201308 A1 | 8/2013 | Tan et al. |
| 2013/0218456 A1 | 8/2013 | Zelek et al. |
| 2013/0250078 A1 | 9/2013 | Levy |
| 2015/0125831 A1 | 5/2015 | Chandrashekhar Nair et al. |
| 2015/0145657 A1* | 5/2015 | Levesque ................ G06F 3/016 340/407.2 |
| 2015/0302772 A1 | 10/2015 | Yu et al. |
| 2017/0103571 A1* | 4/2017 | Beaurepaire ............. G09B 9/02 |
| 2018/0106636 A1 | 4/2018 | Hu et al. |
| 2018/0284881 A1* | 10/2018 | Briggs .................. A63G 21/18 |
| 2019/0056786 A1* | 2/2019 | Pate ...................... G06F 3/0414 |
| 2019/0262739 A1* | 8/2019 | Reichow .................. A61L 9/01 |

* cited by examiner

HAPTIC FEEDBACK SYSTEMS AND METHODS FOR AN AMUSEMENT PARK RIDE

CROSS-REFERENCE TO RELATED APPLICATIONS

This application claims the benefit of U.S. Provisional Application No. 62/672,285, filed May 16, 2018, which is hereby incorporated by reference in its entirety.

BACKGROUND

The present disclosure relates generally to the field of amusement parks. More specifically, embodiments of the present disclosure relate to methods and equipment utilized to enhance amusement park experiences, including haptic feedback techniques for amusement park rides and other attractions.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Various amusement park rides have been created to provide passengers with unique motion and visual experiences. Excitement is often created by the speed or change in direction of the vehicles as they move along a ride path or follow a motion routine. In addition to motion, the scenery surrounding the vehicles along the ride path enhances the overall excitement of the amusement park ride. It is now recognized that it is desirable to improve amusement park ride systems to include features that allow enhancement of aspects of the amusement park ride.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with an embodiment, an amusement park ride system including a ride vehicle, a ride control system that may track a location of the ride vehicle on a ride path and a haptic feedback system having a screen having a surface modifying component. The surface component may be positioned on the ride vehicle. The haptic feedback system also includes a control system having a memory and a processor. The memory stores instructions that, when executed by the processor, may cause the haptic feedback system to convert data from the ride control system into tactile information representative of scenery surrounding the ride vehicle based on stored scenery data that is correlated to the location.

In accordance with an embodiment, a method includes receiving, at a haptic feedback system including a screen with surface modifying components, location data indicative of a location of a ride vehicle along a ride path from a ride controller of an amusement park ride, converting the location data into tactile information representative of scenery of the amusement park ride based on a database correlating tactile representations with locations along the ride path, and recreating the scenery of the amusement park ride at the location on an outer surface of the screen based on the tactile information by activating the surface modifying components of the screen. The surface modifying components are configured to raise or lower portions of an outer surface of the screen.

In accordance with an embodiment, an amusement park ride system includes a haptic feedback system that may be communicatively coupled to a ride control system of the amusement park ride and having a screen that may be positioned on a ride vehicle and having a surface modifying component, a memory storing instructions that may recreate a scenery of the amusement park ride based on a location of the ride vehicle along a ride path of the amusement park ride, and a processor that may execute the instructions to cause the haptic feedback system to provide haptic feedback, via the surface modifying component, that corresponds to the scenery at a particular location indicated by data from the ride control system.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Amusement park attractions use motion and visual effects to provide a guest with an enjoyable and overall positive experience. Certain amusement park attractions may simulate an environment by changing a scenery as a ride vehicle of the amusement park attraction travels along a ride path of the amusement park attraction. The scenery may include a combination of animated figures, characters, and landscapes that simulate an environment associated with a themed attraction. For example, the amusement park attraction may include a ride scenery system (RSS) that stores information associated with the scenery of the ride and tracks the ride vehicle along the ride path. For example, the RSS includes features (e.g., process circuitry and memory) that store three dimensional (3D) information (e.g., a 3D map or model) of the scenery surrounding the ride vehicle or other object or area of the amusement park attraction. The RSS may also store instructions, that when executed, actuate various components of the amusement park attraction to change the scenery or and/or features of the ride vehicle (e.g., orientation along the ride path, speed, etc.) based on a location of the ride vehicle along the ride path, thereby providing excitement to the guests during operation of the ride. Present embodiments include amusement park ride systems that use haptic feedback to convert optical data and/or other data associated with the scenery of the ride into a tactile experience to enhance the ride experience. By using 3-D information and data associated with the scenery surrounding the ride vehicle, the disclosed system and method generates tactile information representative of the scenery surrounding the ride vehicle in real-time. In this way, guests may experience the scenery of the amusement park attraction using their sense of touch. It should be noted that the term "real-time" refers to a timeframe with limited delay that essentially corresponds to actual events as they happen.

The amusement park ride system disclosed herein may include a ride control system having one or more memories and one or more processors. These memories and processors may include features and function as described in further detail below. In certain embodiments, the control system may be communicatively coupled to a computer resident on a ride vehicle (e.g., a tablet) or multiple computers (e.g., various portable devices). The one or more computers are accessible to the guest throughout operation of the amusement park attraction. Collectively, the control system and the computers may incorporate the features and perform these functions described in further detail below. The ride control system is configured to track the ride vehicle along the ride path and to activate tactile features on the one or more computers to enable guests to experience the scenery surrounding the ride vehicle tactilely. For example, the ride control system may activate features on a screen of the one or more computers that change a surface of the screen in a manner that is representative of the scenery surrounding the guest within the ride (e.g., while in a queue line, the ride vehicle, loading station, etc.). The guest may touch and move their hands across the screen to feel and sense the surrounding scenery, thereby experiencing more than the movement of the ride vehicle and the visible scenery of the amusement park attraction.

Figure 1:
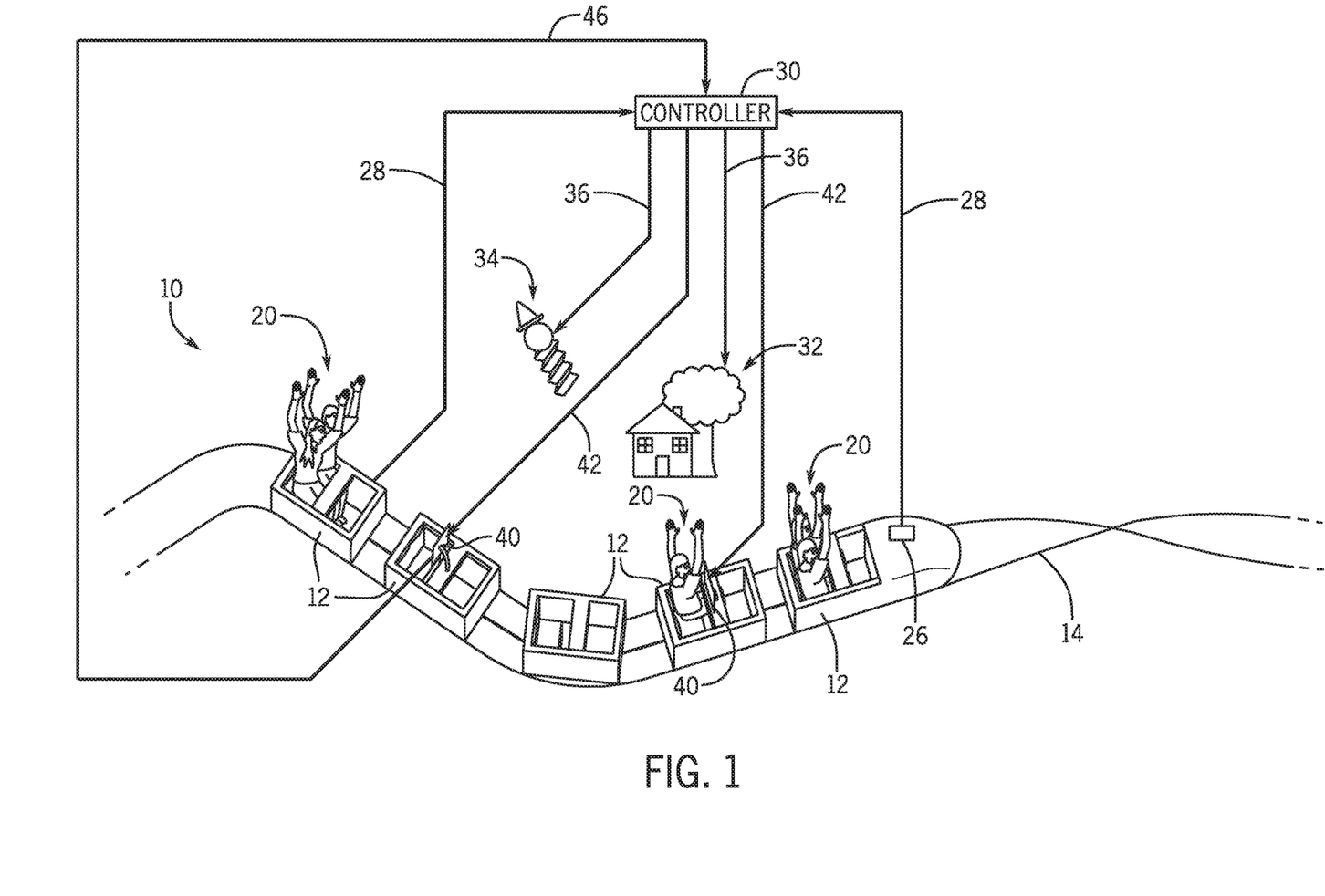
FIG. 1 illustrates an amusement park ride having a haptic feedback system configured to provide haptic feedback that recreates a ride environment surrounding a guest in accordance with present embodiments.

With the foregoing in mind, FIG. 1 illustrates an embodiment of an amusement park attraction including features that enable guests to feel and sense the scenery surrounding them while in the amusement park attraction in accordance with the present disclosure. In particular, FIG. 1 illustrates an embodiment of an amusement park attraction 10 (hereinafter referred to as "ride 10") with multiple ride vehicles 12 traveling along a ride path 14 (e.g., a track). In certain embodiments, the ride vehicles 12 form a train of multiple ride vehicles connected to one another. In other embodiments, each ride vehicle 12 is separate from and operates independently of the other ride vehicles 12 in the ride 10. The ride vehicles 12 support and transport one or more guests 20 throughout operation of the ride 10. Additionally, the ride vehicles 12 each include various features that enable the guests 20 to have a positive experience when riding the ride 10. For example, the ride vehicles 12 may include a tracking device 26 (e.g., a Global Positioning System tracking device, a sensor, or the like) that tracks a location of the ride vehicles 12 and communicates with a controller 30 of the ride 10. The tracking device 26 outputs a signal 28 to the controller 30 of the ride 10, providing the controller 30 with information associated with a location of the ride vehicle 12 along the ride path 14. Based on the position of the ride vehicles 12, as determined by the tracking device 26, the controller 30 may actuate one or more features of a scenery 32 surrounding the ride vehicle 12, via a signal 36, and/or control certain movements of the ride vehicle 12 (e.g., rotate, change speed, direction, etc.) to provide the guests 20 with an exciting and enjoyable experience. The scenery 32 includes objects and/or animated FIG. 34 that create visual effects that create a themed attraction and entertain the guests 20. Accordingly, during operation of the ride 10, the signal 36 activates certain features of the scenery 32 or the animated FIG. 34 in real-time to entertain and engage the guests 20. In certain embodiments, each ride vehicle 12 includes the tracking device 26. In other embodiments, only a portion of the ride vehicles 12 include the tracking device 26. For example, in embodiments in which the ride vehicles 12 are coupled to one another, the tracking device 26 may be disposed on a portion of the ride vehicles 12 (e.g., every other ride vehicles 12 in the group of connected ride vehicles).

The ride vehicle 12 may include a haptic feedback system 40 (e.g., a computer) or guest interface that enables the guest 20 to feel and sense the surrounding scenery 32 instead of or in addition to viewing it. For example, as discussed in further detail below, information (e.g., optical data) provided by the controller 30 associated with the scenery 32 and/or other surrounding features may be recreated on a screen of the haptic feedback system 40. The haptic feedback system 40 may include a window, a computer tablet fixedly or removably attached to the ride vehicle 12, or any other suitable screen having actuatable surface features that change a texture of a surface of the screen in a manner that recreates the scenery 32 on the surface. By changing the texture of the surface, the guest 20 can touch the surface to feel and sense the scenery 32. In certain embodiments, the haptic feedback system 40 may be a portable electronic device that is provided to the guest 20 while in a queue or loading station of the ride 10. In this particular embodiment, the ride vehicle 12 may include a docking station for the haptic feedback system 40. A portable haptic feedback system may also allow the guest 20 to experience the environment surrounding the queue, which provides for an overall enjoyable and positive experience. The portable haptic system may include a tracking device (e.g., the tracking device 26) such that a location of the guest 20 within the ride 10 (e.g., in the queue line) may be tracked.

When the haptic feedback system 40 is coupled to the docking station or before the ride vehicle 12 is released from the loading station, the haptic feedback system 40 may send a pairing signal 46 to the controller 30 indicating that the haptic feedback system 40 is ready for use with the ride 10. Once ready for use, the haptic feedback system 40 may receive a signal 42 and recreate the scenery 32 on the screen of the haptic feedback system 40 as the ride vehicle 12 moves along the ride path 14. For example, when not in use, the haptic feedback system 40 may be in standby mode. While in standby mode, the haptic feedback system 40 may not receive the signal 42 from the controller 30 and, therefore, the scenery 32 is not recreated on the screen of the haptic feedback system 40. To place the haptic feedback system 40 in an active mode (e.g., a mode that recreates the scenery 32 on the screen), the guest 20 or a ride operator may activate a switch that triggers the haptic feedback system 40 to transmit the pairing signal 42. After completion of the ride 10, the controller 30 may transmit a signal to the haptic feedback system 40 to place the system 40 in standby mode until another guest 20 enters the ride 10. In certain embodiments, the haptic feedback system 40 may enter the standby mode if activity is not detected after a certain amount of time. For example, the screen may include sensors (e.g., a pressure sensor) that detects when the guest 20 is touching the screen. If the screen remains untouched for an extended period of time, the haptic feedback system 40 may automatically activate the standby mode. Once the guest 20 touches the screen, the haptic feedback system 40 automatically enters the active mode.

The controller 30 is configured to store information associated with the ride 10, such as data corresponding to the scenery 32 and its reproduction in haptic form, and to track the location of the ride vehicle 12 and/or the guest 20 within the ride 10. Based on the position of the ride vehicle 12 and/or guest 20, the controller 30 transmits the signal 42 to the haptic feedback system 40. The signal 42 contains data associated with the scenery 32 and triggers the haptic feedback system 40 to activate the surface features on the screen that recreate the surrounding scenery 32. The guest 20 may touch the screen to feel and sense the surface features, thereby experiencing the surrounding environment (e.g., the scenery 32 and the animated FIG. 34) using their sense of touch in addition to other senses.

Figure 2:
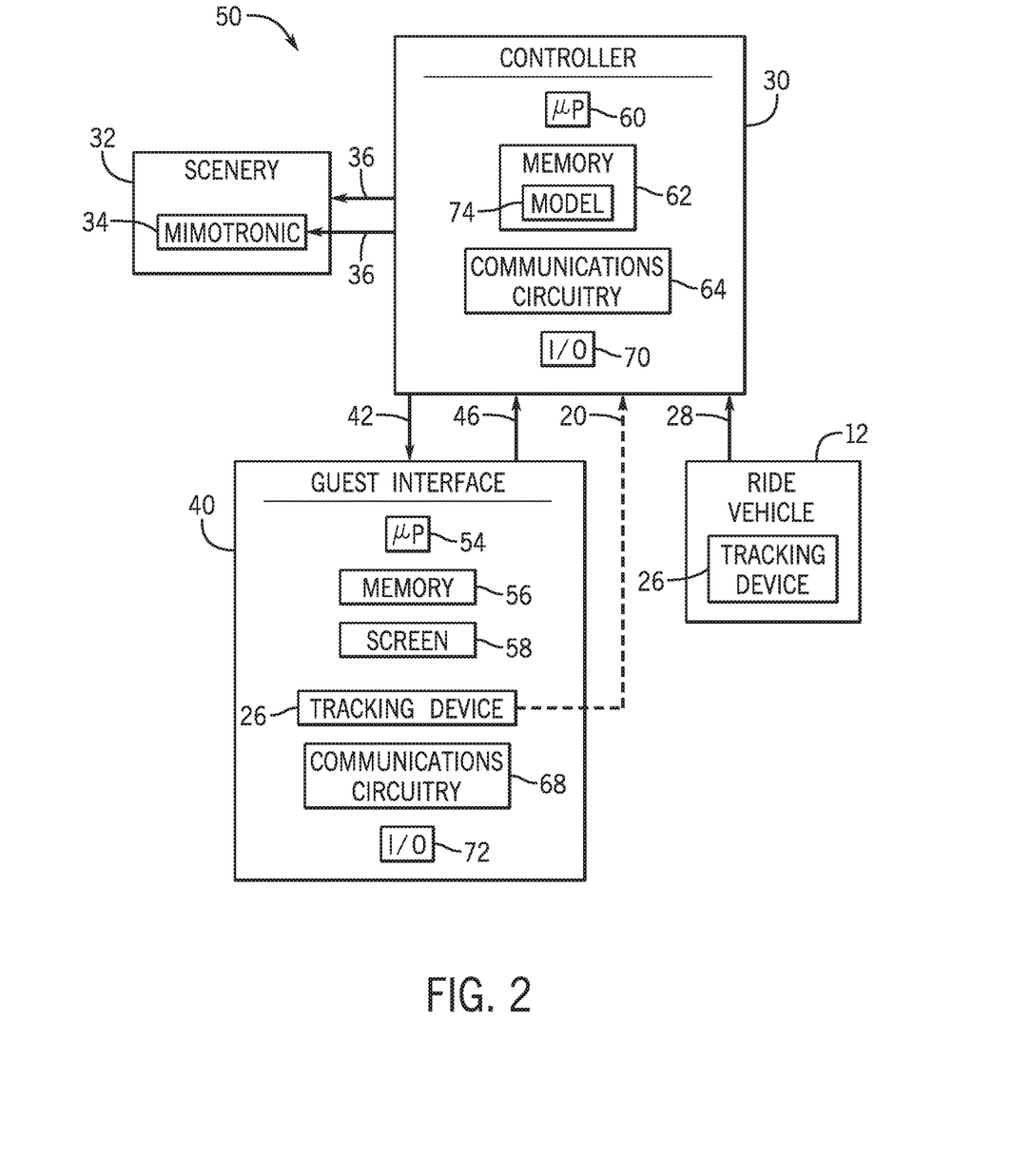
FIG. 2 is a block diagram of a ride control system of the amusement park ride of FIG. 1 integrated with the haptic feedback system, the ride control system storing a model of a ride environment (e.g., scenery) in accordance with present embodiments.

To facilitate discussion of the following embodiments, reference will be made to tracking the ride vehicle 12. However, it should be understood that the disclosed embodiments are also applicable to tracking the guest 20 at other locations within the ride 10 or the amusement park (e.g., via a portable haptic feedback system). The ride vehicle 12, the controller 30, and the haptic feedback system 40 each include features that facilitate communication between them, and enhance the amusement experience for the guest 20. FIG. 2 illustrates a block diagram of an embodiment of a ride control system 50 in which the controller 30 is integrated with the haptic feedback system 40 used by the guest 20. In the illustrated embodiment, the ride control system 50 includes the controller 30, the haptic feedback system 40, the actuatable scenery 32, and the ride vehicle 12. The communication between the controller 30, the haptic feedback system 40, the scenery 32, and the ride vehicle 12 may be wireless or via a wired connection. The controller 30 is configured to monitor a status of the ride 10 (e.g., loading, unloading, operating, not operating, delays, etc.) and to control operating parameters (e.g., start, pause, resume, reset, or otherwise adjust a parameter of the attraction). In addition, the controller 30 is configured to control various features of the ride 10 such as, but not limited to, release of the ride vehicle 12 from a loading station, stopping the ride vehicle 12 at an unloading station, controlling speed and movements of the ride vehicle 12 along the ride path 14, actuating visual effects in the scenery 32, the animated FIG. 34, and the haptic feedback system 40 among other features of the ride 10.

As discussed above, the controller 30 transmits the signal 42 containing information (e.g., optical data) associated with the scenery 32 of the ride 10. The signal 42 triggers the haptic feedback system 40 to actuate surface features on a screen that recreate the surrounding scenery 32. To activate the haptic feedback system 40 and enable communication between the controller 30 and the haptic feedback system 40, the haptic feedback system 40 may transmit the pairing signal 46 to the controller 30. The pairing signal 46 may be transmitted when the ride vehicle 12 is ready for release from the loading station (e.g., when restraints are fastened, ride door closed, etc.), when a ride operator or the guest 20 activates a switch (e.g., pushes a button on the haptic feedback system 40), when the haptic feedback system 40 is positioned on a docking station on the ride vehicle (e.g., if using a portable haptic feedback system). The haptic feedback system 40 may include one or more processors 54, one or more memories 56 (e.g., hard drives), and a screen 58. The memory 56 stores instructions, that when executed by the processor 54, instructs the haptic feedback system 40 to transmit the pairing signal 46 to the controller 30 in response to a stimuli. For example, the guest 20 or ride operator may activate a switch on the haptic feedback system 40 to transmit the pairing signal 46. The pairing signal 46 indicates to the controller 30 that the haptic feedback system 40 is ready to receive, via the signal 42, information stored in the controller 30 that is associated with visual aspects (e.g., the scenery 32) of the ride 10.

Similar to the haptic feedback system 40, the controller 30 includes at least one processor 60 and one or more memories 62 (e.g., hard drives) that enable the controller 30 to monitor, track, and activate certain components of the ride 10 based on information received from tracking devices (e.g., the tracking device 26) that track a location of the ride vehicle 12 and, in certain embodiments, the guest 20 (e.g., location in the queue line as monitored by a tracking device on a portable haptic feedback system) within the boundaries of the ride 10. The memory 56, 62 includes one or more tangible, non-transitory, machine-readable media. By way of example, such machine-readable media can include RAM, ROM, EPROM, EEPROM, optical disk storage, magnetic disk storage or other magnetic storage devices, or any other medium which can be used to carry or store desired program code in the form of machine-executable instructions or data structures and which can be accessed by the processor 54, 60 or by any general purpose or special purpose computer or other machine with a processor. The controller 30 and the haptic feedback system 40 may also include communications circuitry 64, 68 and/or input and output circuitry 70, 72 to facilitate communication with other components of the ride 10. In addition, the controller 30 may be coupled, wirelessly or via a wired connection, to an operator input device or operator interface that, in operation, may be used by a ride operator to provide input used to control one or more ride features.

The memory 62 of the controller 30 may store 3D information (e.g., model 74) associated with the ride 10. For example, the memory 62 may store a 3D map of the ride 10. The 3D map may include the ride path 14 and structural features (e.g., animated figures, characters, landscape, and the like) of the scenery 32 surrounding the ride vehicle 12 along the ride path 14. In essence, this 3D map includes data that can provide a haptic representation of surroundings to allow for a haptic experience of those surroundings to supplement other senses (e.g., visual input, audio input, temperature). Based on the 3D map of the ride 10, and timing or location data from the tracking device 26, the controller 30 is able to identify the structural features at each location of the ride vehicle 12 along the ride path 14 during operation of the ride 10 and/or the location of the guest 20 within the boundaries of the ride 10. The processor 60 of the controller 30 may use data (e.g., optical data) from the 3D map to actuate features on a surface of the screen 58 of the haptic feedback system 40. As discussed above, the features actuated on the surface of the screen 58 are representative of the scenery 32 surrounding the ride vehicle 12. For example, the screen 58 may include one or more features that modify a surface of the screen 58 or emit signals (e.g., acoustic waves, vibrations) in response to the data associated with the location of, for example, the ride vehicle 12 and/or guest 20 along the ride path 14. Once actuated, the features on the screen 58 convert the data into tactile information to recreate the scenery 32 surrounding the ride vehicle 12. That is, the one or more features change a texture of the screen 58 to provide haptic feedback, and enable the guest 20, to use their hands to feel and sense the surrounding scenery 32 during operation of the ride 10 in addition to their other senses.

In addition to the 3D map, the memory 62 of the controller 30 also stores instructions executable by the processor 60 of the controller 30 to perform the methods and control actions described herein. For example, the processor 60 may execute instructions for tracking the location of the ride vehicle 12 via the signal 28. The processor 60 may also execute instructions for actuating one or more features of the ride 10 and/or the scenery 32, via the signals 36, at specific times based on the location of the ride vehicle 12 along the ride path 14. For example, during operation of the ride 10, one or more portions of the scenery 32 may become animated and perform an action (e.g., move, speak, etc.) or other visual effect when the ride vehicle 12 is in close proximity to the scenery 32. By activating portions of the scenery 32 of the ride 10 based on the location of the ride vehicle 12 along the ride path 14, the guests 20 may easily view or sense the animation and visual effects surrounding the ride vehicle 12, which provides an enjoyable and entertaining experience.

As discussed above, the haptic feedback system 40 may enable guests 20 to also experience the scenery 32 via the sense of touch. Therefore, the processor 60 of the controller 30 may also execute instructions stored in the memory 60 of the controller 30 to transmit the signal 42 containing data associated with the 3D map of the scenery 32 to the haptic feedback system 40. In response to receiving the signal 42, the processor 54 of the haptic feedback system 40 executes instructions stored in the memory 56 of the haptic feedback system 40 to actuate surface features of the screen 58 in real-time based on a location of the ride vehicle 12. The actuated surface features on the screen 58 simulate (e.g., recreate) the scenery 32 surrounding the ride vehicle 12. For example, the screen 58 includes one or more features that respond to the stimuli triggered by the signal 42 transmitted by the controller 30 during the ride 10. The one or more surface features change a texture of the surface of the screen 58 to recreate the scenery 32. The guest 20 may touch and move their hand(s) across the surface of the screen 58 to feel and sense the surrounding scenery 32 with their sense of touch. In this manner, the guest 20 may have a more enjoyable and exciting experience compared to rides that do not include the haptic feedback system 40 disclosed herein.

Integrating the haptic feedback system 40 with the controller 30 of the ride 10 may increase the resolution of the screen 58 to recreate the scenery 32. This is due, in part, to the controller 30 providing the 3D map and other information associated with the scenery 32, rather than the haptic feedback system 40 scanning the scenery 32 and analyzing the data collected from the scan to recreate the scenery 32 in real-time. Moreover, because the haptic feedback system 40 is not scanning and analyzing data associated with the scenery 32, it may not be necessary for the haptic feedback system 40 to have a real-time sensors for scanning the scenery 32. As such, the design of the haptic feedback system 40 may be simplified, thereby reducing the overall cost and operational efficiency of the haptic feedback system 40.

Figure 3:
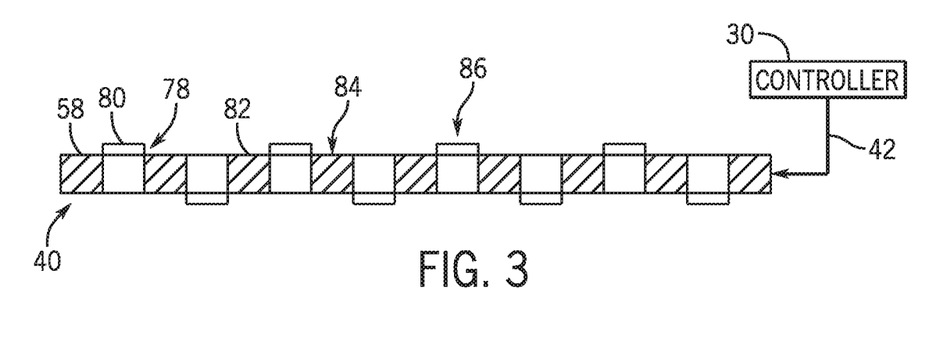
FIG. 3 illustrates a screen or surface of the haptic feedback system incorporating cells configured to be actuated to create a screen or surface texture corresponding to a view based on instructions from the ride control system of FIG. 2 in accordance with present embodiments.
Figure 4:
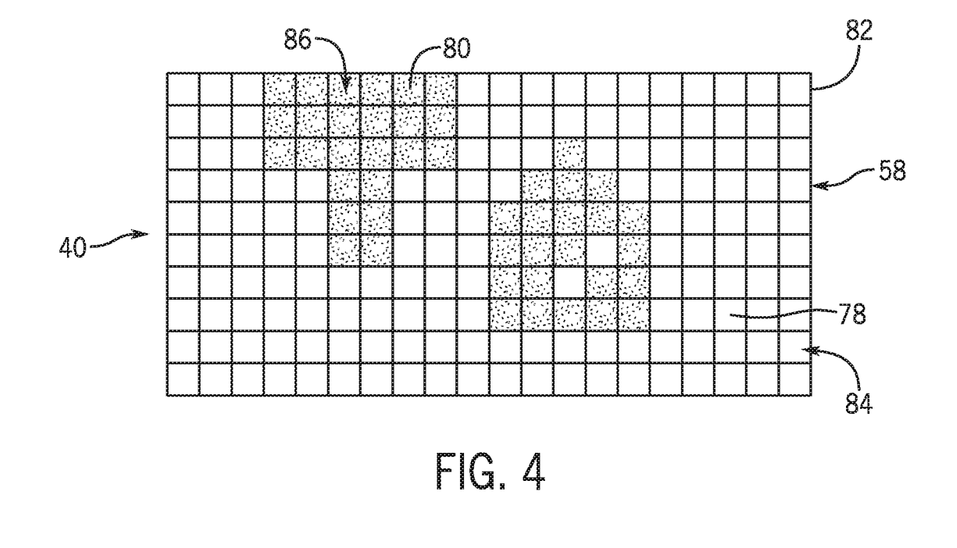
FIG. 4 illustrates a top view of the screen of FIG. 3 having the cells arranged in a grid pattern, the screen having a textured portion corresponding to the view in accordance with present embodiments.

To enable the activation of the one or more features of the screen 58 in response to the signals 42, the processor 54 of the haptic feedback system 40 may execute instructions stored in the memory 56 to convert the information (e.g., the optical data) received from the signal 42 into bumps on the surface of the screen 58, similar to braille, that form a shape of a structural feature associated with the surrounding scenery 32. For example, FIG. 3 illustrates an embodiment of the haptic feedback system 40 in which the screen 58 includes a plurality of pegs 78 (or cells) that form bumps 80 on at least a portion of an outer surface 82 that form the shape of a structural feature associated with the surrounding scenery 32. In the illustrated embodiment, the outer surface 82 of the screen 58 includes flat portions 84 (e.g., unraised, leveled) and a raised portion 86 having the bumps 80. The portions 84, 86 form contours on the outer surface 82 of the screen 58 that simulate the scenery 32 and enable the guest 20 to feel the scenery 32 surrounding them using their sense of touch. The plurality of pegs 78 may be arranged in a grid pattern, as shown in FIG. 4. The pegs 78 are similar to pixels on a screen. The amount of pegs 78 on the surface 82 of the screen 58 may vary. The greater the number of pegs 78 per square inch of the screen 58 the greater the resolution of the scenery 32 recreated on the surface 82. The pegs 78 move in response to one or more stimuli (e.g., a magnetic field, electric current) in a direction away from the screen 58 and toward the guest's hands. At least a portion of the pegs 78 protrude out from the screen 58, thereby forming the bumps 80 on the surface 82 of the screen 58.

Figure 5:
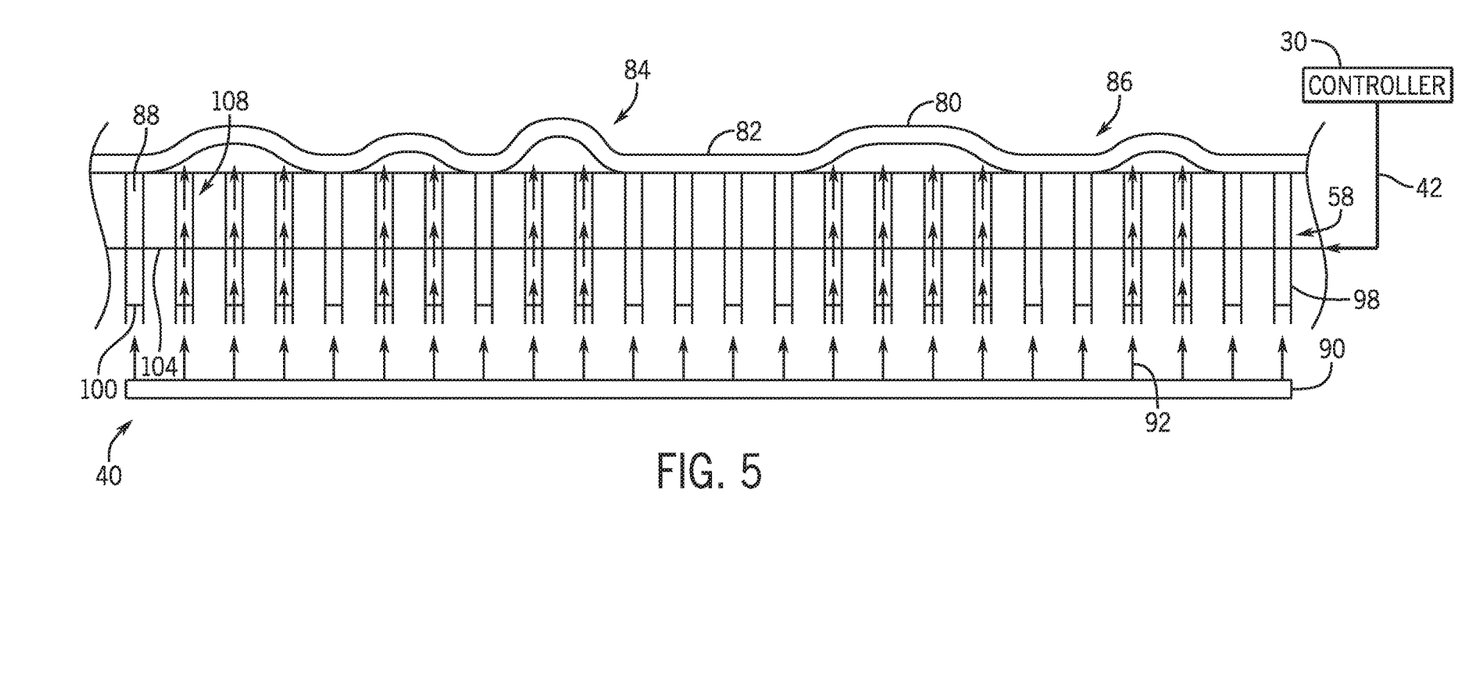
FIG. 5 illustrates a screen or surface of the haptic feedback system of FIG. 2 incorporating a flexible layer configured to be adjusted (e.g., expanded based on fluid pressure) to provide texture effects corresponding to a view in response to fluid injected via ports based on instructions from the ride control system in accordance with present embodiments.

In certain embodiments, the screen 58 may have pockets or cells that expand or contract in response to a stimuli. For example, FIG. 5 illustrates an embodiment of the haptic feedback system 40 in which the screen 58 includes pockets 88. Each pocket 88 may include a flexible surface layer (e.g., membrane, film, or the like) that may expand and contract based on the received signal 42 to form the bumps 80 on the outer surface 82. Each pocket 88 may be independently activated to selectively create the bumps 80 that form a shape associated with the structural feature of the scenery 32 surrounding the ride vehicles 12. In this way, the haptic feedback system 40 may recreate the scenery 32 in real-time as the ride vehicle 12 moves along the ride path 14 during operation of the ride 10. For example, the pockets 88 may be filled with a fluid that expands (or inflates) the pocket 88 to form the bumps 80 and provide tactile information. As a specific example, the face of an animated figure that can be seen in the environment can also be felt to enhance the experience of the guest 20. In some embodiments, the haptic feedback may not directly correspond to the scenery but may be indicative of a mood. For example, a quiet and peaceful environment may provide smooth haptic feedback while a spooky environment may include periodic high intensity haptic activity spaced apart in time by smooth haptic feedback.

In the illustrated embodiment, the haptic feedback system 40 includes a fluid reservoir 90 that forms part of a layer of the screen 58. The fluid reservoir 90 may store any suitable fluid 92 (e.g., gas, liquid, or both) that may be used to expand the surface layer of the respective pocket 88 to form the bumps 80. The fluid reservoir 90 may be refilled after a certain number of uses of the haptic feedback system 40. During use, the fluid reservoir 90 may be removably coupled to a fluid source that may continuously provide the fluid 92 to the fluid reservoir 90. Fluid channels 98 (or ports) fluidly couple the respective pockets 88 to the fluid reservoir 90. Each fluid channel 98 independently delivers the fluid 92 to the respective pocket 88 to form the bumps 80. For example, in operation, the processor 54 of the haptic feedback system 40 may actuate a valve 100 disposed between the fluid reservoir 90 and the pocket 88 in response to a stimuli. When the valve 100 is actuated, the fluid channel 98 is opened to allow fluid communication between the fluid reservoir 90 and the pocket 88. As such, the fluid 92 flows from the fluid reservoir 90 to the pocket 88, thereby filling the pocket 88 with the fluid 92 and expanding the surface layer of the pocket 88 to form the bump 80. When the scenery 32 changes based on the location of the ride vehicle 12, the processor 54 of the haptic feedback system 40 may close the valve 100 in response to another stimuli to block the fluid 92 from entering the pocket 88 and opens a drain valve 104 disposed within a drain channel 108 (or port) that releases the fluid 92 from the respective pocket 88 and directs the fluid 92 to the fluid reservoir 90. In one embodiment, the valve 100 may be a two-way valve that may be switched in one direction to allow the fluid 92 to flow in the direction of the pocket 88 to expand the pocket 88 and form the bump 80, and switched in another direction to allow the fluid 92 to flow in the direction of the fluid reservoir 90 to drain the fluid 92 from the pocket 88. In this embodiment, the screen 58 may not have the drain channel 108.

In certain embodiments, the screen 58 may include a combination of the pockets 88 and the pegs 78. Each pocket 88 and/or peg 78 may be actuated independently to generate tactile information (e.g., the bumps 80) that recreate the scenery 32 surrounding the ride vehicle 12. As the ride vehicle 12 moves along the ride path 14, the haptic feedback system 40, via the processor 54, changes the pockets 88 and/or pegs 78 actuated such that the tactile information provided on the screen 58 changes to recreate the changing scenery 32 in real-time. The combination of the pockets 88 and the pegs 78 may enable the guest 20 to feel different textures that may distinguish features of the scenery 32. For example, in certain embodiments, the pegs 78 may have a hardness that is greater than the fluid 92 within the pockets 88. As such, the pegs 78 may be activated to recreate a hard object (e.g., a rock) and the pockets 88 may be activated to recreate a softer object (e.g., water, leaves, etc.).

In another embodiment, the pockets 88 may include materials such as electrorheological (ER) or magnetorheological (MR) materials. That is, the pockets 88 may be filled with the ER or MR materials. In this particular embodiment, the haptic feedback system 40 may not include the channels 98, 108. The ER and the MR materials respond to an electrical stimulus and a magnetic stimulus, respectively. In the absence of the respective stimulus, the ER and MR materials are in a liquid state. However, when the respective stimulus is applied, a viscosity of the ER and MR materials increases. The increase in the viscosity results in formation of a solid gel, thereby forming the bumps 80 on the outer surface 82 of the screen 58. For example, when the ER and MR materials are in the liquid state, the outer surface 82 of the screen appears smooth (e.g., even, non-textured). That is, the outer surface 82 does not have the bumps 80. However, when the respective stimulus is applied, the viscosity of the ER and MR materials increases and forms a solid gel that causes the pockets 88 to expand in a manner that forms the bumps 80 on the outer surface 82 of the screen 58.

Figure 6:
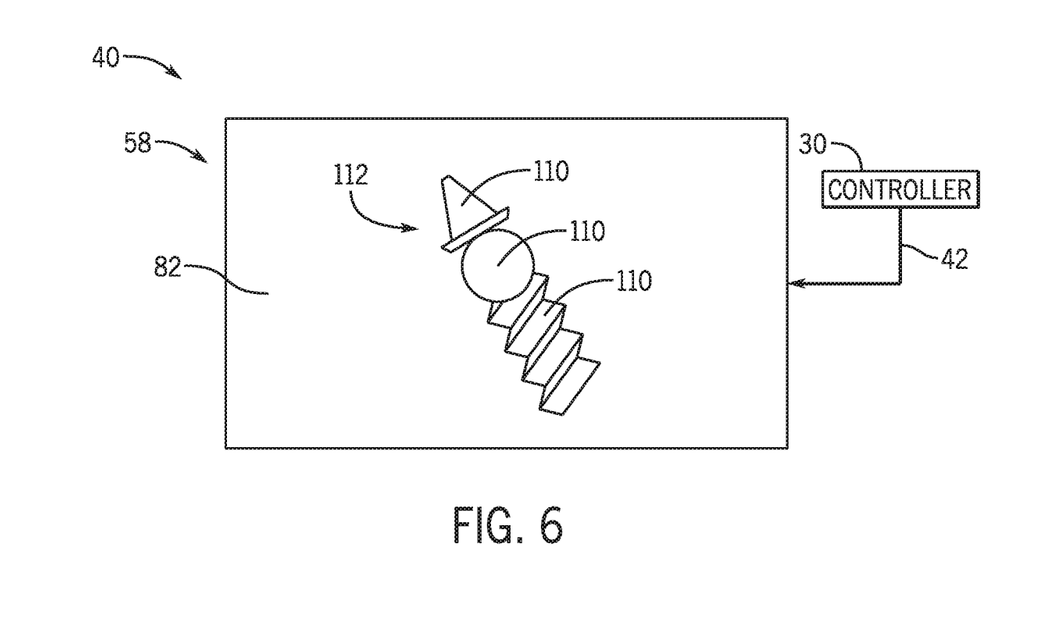
FIG. 6 illustrates a screen or surface of the haptic feedback system of FIG. 2 configured to vibrate to provide different vibrations in different areas of the screen or surface corresponding to a view based on instructions from the ride control system in accordance with present embodiments.

In certain embodiments, the haptic feedback system 40 may convert the information received from the signal 42 (e.g., optical data) into acoustic waves or vibrations. The vibrations 110 create a pattern 112 on the outer surface 82 of the screen 58 to recreate the scenery 32 surrounding the ride vehicle 12, as shown in FIG. 6. For example, intensity of the vibrations 110 on the outer surface 82 may vary. Based on the intensity of the vibrations 110, different shapes and/or contours on the outer surface 82 may be created that are representative of the surrounding scenery 32. The guest 20 may run their fingers across the screen 58 to feel the bumps 80, surface changes, and/or vibrations 110, thereby experiencing the scenery 32 surrounding the ride vehicle 12 in real-time using their sense of touch.

In other embodiments, the screen 58 includes magnetic particles (e.g., nanomagentic particles) that respond to a magnetic field. Each magnetic particle may be individually actuated by the magnetic field in response to the signal 42 received from the controller 30. The magnetic particles may modify the outer surface 82 of the screen 58 to provide haptic feedback to the guest 20. For example, in response to the signal 42, the haptic feedback system 40 may activate and/or change a magnetic field of the screen 58. The magnetic particles may vibrate in response to the magnetic field. The vibrations 110 may form the pattern 112 on the screen 58 that is representative of the surrounding scenery 32. In other embodiments, the magnetic field may cause the magnetic particles to move. For example, the magnetic field may form a gradient on the screen 58. The magnetic particles may migrate to form the patterns 112 representing the surrounding scenery 32 on the screen 58 based on the magnetic field.

In one embodiment, the screen 58 may include polymers that respond to a stimuli (e.g., electrical current, temperature). For example, the screen 58 may include electroactive polymers (EAP), such as ferroelectric polymers that vibrate in response to an electric signal. The haptic feedback system 40 may be configured to generate the electrical signal in response to the signal 42 from the controller 30. Based on the intensity of the vibrations 110, the guest 20 may feel different shapes on the screen 58 that simulate the scenery 32 surrounding the ride vehicle 12. In one embodiment, the screen 58 may include light emitting diodes (LED) that vibrate at different frequencies and intensities. The LEDs may be actuated by the processor 54 of the haptic feedback system 40 in response to the signal 42 to simulate the scenery 32 surrounding the ride vehicle 12 based on vibrations 110 of different intensities as the ride vehicle 12 travels along the ride path 14. Other materials, such as piezoelectric materials and carbon nanotubes are also within the scope of the present disclosure. Accordingly, in this manner, as the ride vehicle 12 moves along the ride path 14, the haptic feedback system 40 changes the outer surface 82 of the screen 58 such that tactile information provided on the screen 58 changes to recreate the changing scenery 32 in real-time.

As discussed above, the haptic feedback system 40 may be integrated with the ride control system 50 such that the haptic feedback system 40 does not need to scan and analyze information associated with scenery 32 during operation of the ride 10. In this way, the resolution of the tactile information provided on the screen 58 may be improved compared to devices that scan and analyze information related to a surrounding environment. The haptic feedback provided on the screen 58 may be representative of a 180° to 360° field of view. The haptic feedback system 40 may be fixedly attached or removably coupled to the ride vehicle 12, and may include one or more screens 58 integrated into the ride vehicle 12. The one or more screens 58 may be located on a window, an arm or hand rests, a ride restraint (e.g., a lap bar), on a back of a ride seat that is positioned in front of the ride seat occupied by the guest 20, or any other suitable location that facilitates access to and provides comfort to the guest 20.

Figure 7:
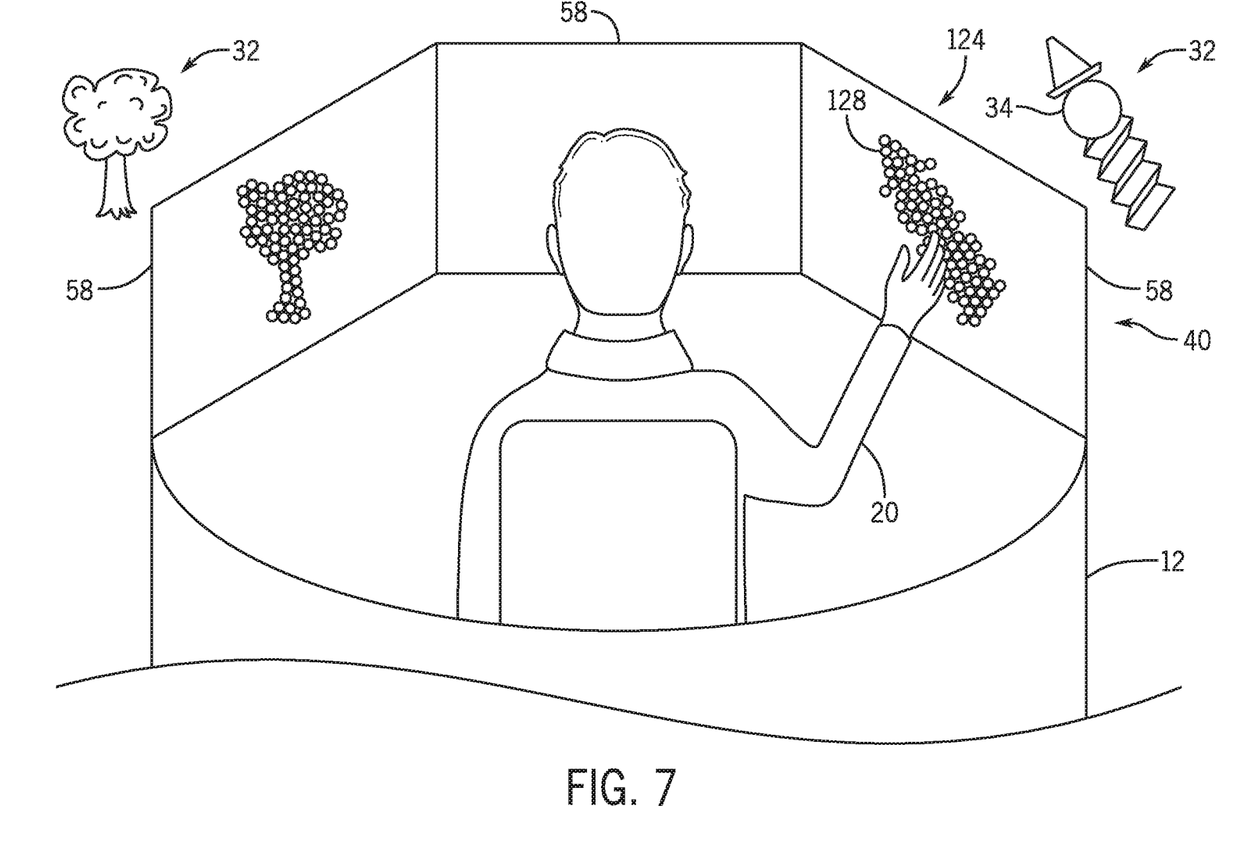
FIG. 7 illustrates a ride vehicle with a haptic feedback system having multiple active surfaces that correspond to or include windows of the ride vehicle, wherein each active surface is configured to provide tactile information about a respective view based on instructions from the ride control system in accordance with present embodiments.

FIG. 7 illustrates an embodiment of the ride 10 in which the haptic feedback system 40 includes multiple screens 58 fixed onto a portion of the ride vehicle 12. The screens 58 are positioned in an area of the ride vehicle 12 that is readily accessible to the guest 20. For example, as illustrated, the screens 58 are located on windows 124 of the ride vehicle 12. The arrangement of the screens 58 provides a field of view of 180° such that the guest 20 may have a haptic experience of a substantial portion of the scenery 32 surrounding the ride vehicle 12. The guest 20 may position their hands on a surface 128 of the screens 58 to feel the changes corresponding to the scenery 32 surrounding the ride vehicle 12 in real-time as the ride vehicle 12 moves along the ride path 14. In the illustrated embodiment, the guest 20 is unable to move the screen 58 during operation of the ride 10.

The windows 124 may be transparent or opaque. In certain embodiments, the ride vehicle 12 may have a window compartment that retains the windows 124 when not in use. In this way, the ride vehicle 12 may be used by the guests 20 without having the windows 124 obstruct their field of view. For example, when a guest 20 enters the ride vehicle 12, the ride operator may actuate a switch that releases the window 124 from the window compartment, similar to raising a car window. After completion of the ride 10, the controller 30 may send a signal to the ride vehicle 12 that triggers storage of the windows 124 within the window compartment. For example, the windows 124 may be lowered into the window compartment.

Figure 8:
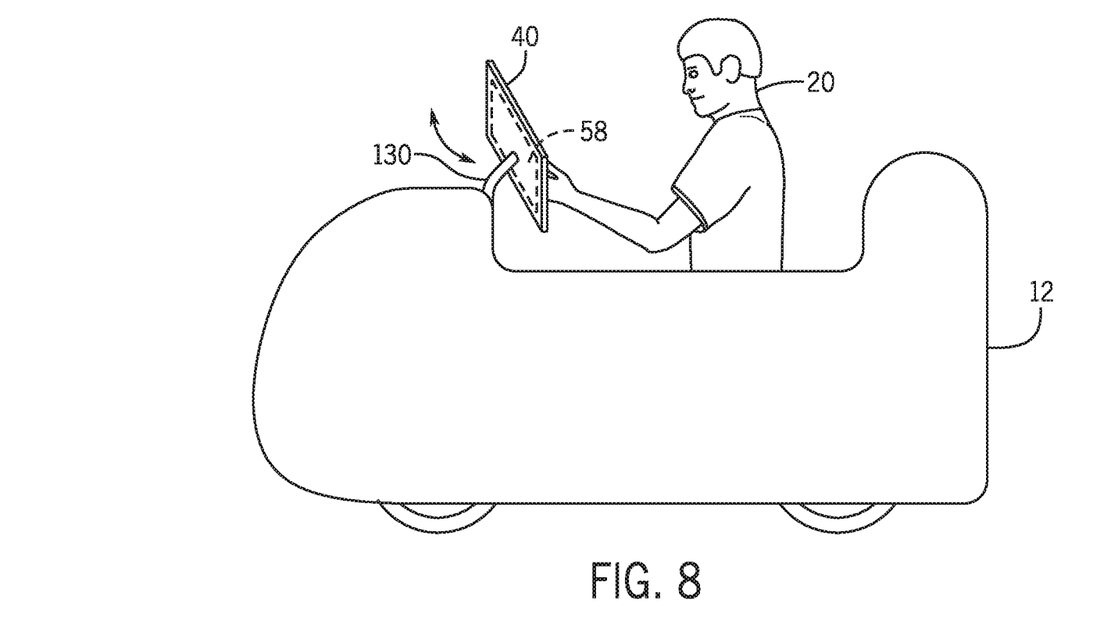
FIG. 8 illustrates a ride vehicle having a haptic feedback system that includes an active surface (e.g., a screen or surface as described with respect to FIGS. 3-6 or some combination thereof) configured to rotate to provide view information based on a position of the ride vehicle upon which it is installed and an orientation of the active surface based on instructions from the ride control system in accordance with present embodiments.

In certain embodiments, the screens 58 are movable. For example, the haptic feedback system 40 may be positioned on a moveable arm that allows the guest 20 to move the haptic feedback system 40, and consequently the screen 58, as shown in FIG. 8. In the illustrated embodiment, the haptic feedback system 40 is disposed on a movable arm 130 attached to the ride vehicle 12. The movable arm 130 may swivel, rotate, translocate, slide, pivot, or otherwise move to allow the guest 20 to move the screen 58 in a manner that allows them to feel the scenery 32 surrounding the ride vehicle 12. In certain embodiments, the screen 58 may receive optical data (e.g., the signal 42) corresponding to a portion of the scenery 32 surrounding the ride vehicle 12, for example, a field of view less than approximately 180°. The guest 20 may move the screen 58, via the movable arm 130, to position the screen 58 toward a desired viewing area to sense the scenery 32 surrounding the ride vehicle 12 in the selected area.

In one embodiment, the movable arm 130 may be part of a docking station for the haptic feedback system 40. As discussed above, the haptic feedback system 40 may include a portable device. The portable haptic feedback system may be provided to the guest 20 at an entrance or a loading station of the ride 10. When the guest 20 loads the ride vehicle 12, a ride operator may retrieve the portable screen (e.g., portable haptic feedback system) from the guest 20 and place the screen on the docking station. Once docked, the portable screen may receive the optical data (e.g., the signal 42) associated with the position of the ride vehicle 12 and the scenery 32 along the ride path 14 and convert the optical data to tactile information on the portable screen.

It should be noted that various aspects of the embodiments illustrated in FIGS. 1-8 may be combined in accordance with the present disclosure. Further, while the illustrated embodiments generally include a controller system that controls the active surface or surfaces based on a stored model of a ride environment, some embodiments may not utilize or include the stored model. Furthermore, the controller system may include components onboard and off-board of a respective ride vehicle.

The haptic feedback system disclosed herein enables guests to experience the visual aspects of an amusement park ride in a haptic manner and also allows for haptic experiences of a mood or theme (e.g., spooky, calm, intense). The haptic feedback system receives information associated with scenery surrounding the guest and/or a ride vehicle of the amusement park ride and converts the information received into tactile data to recreate the scenery on a screen of the haptic feedback system. In this way, the guest may feel the haptic feedback on the screen and experience the scenery surrounding them while in the amusement park ride. By integrating the disclosed haptic feedback system with the ride control system, it may not be necessary for the haptic feedback system to have sensors that scan the scenery surrounding a ride vehicle of the amusement park ride and analyze the scanned data in real-time. Rather, the haptic feedback system may receive information associated with the environment surrounding the ride vehicle that is stored in the ride control system. In this way, the resolution of the haptic feedback may be higher than systems that scan and analyze objects in real-time.

While only certain features of the present disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An amusement park ride system, comprising:
a ride vehicle;
a ride control system configured to track a location of the ride vehicle on a ride path; and
a haptic feedback system comprising:
a screen comprising a surface modifying component, wherein the screen is positioned on the ride vehicle; and
a control system comprising one or more memory devices and one or more processors, wherein the one or more memory devices store instructions that, when executed by the one or more processors, cause the haptic feedback system to:
receive location data indicative of the location of the ride vehicle on the ride path from the ride control system;
convert the location data from the ride control system into a tactile representation of scenery surrounding the ride vehicle based on stored scenery data correlating to the location; and
output the tactile representation of the scenery surrounding the ride vehicle on a surface of the screen using the surface modifying component.

2. The amusement park ride system of claim 1, comprising a tracking device disposed on the ride vehicle and configured to transmit a signal to the ride control system, wherein the signal is indicative of the location of the ride vehicle.

3. The amusement park ride system of claim 1, wherein the screen of the haptic feedback system is removably coupled to the ride vehicle.

4. The amusement park ride system of claim 1, wherein the screen of the haptic feedback comprises a plurality of windows disposed around a portion of the ride vehicle.

5. The amusement park ride system of claim 1, wherein the surface modifying component comprises a plurality of pegs, wherein each peg of the plurality of pegs is individually actuated.

6. The amusement park ride system of claim 1, wherein the surface modifying component comprises a plurality of cells, wherein each cell of the plurality of cells comprises a fluid and is individually actuated.

7. The amusement park ride system of claim 6, wherein each cell of the plurality of cells is configured to be actuated by the fluid, wherein the fluid expands an outer surface of individual cells of the plurality of cells to create bumps on the surface of the screen.

8. The amusement park ride system of claim 6, wherein a viscosity of the fluid is increased in an actuated cell of the plurality of cells to create a bump on the surface of the screen.

9. The amusement park ride system of claim 1, wherein the surface modifying component comprises an electroactive polymer (EAP), carbon nanotubes, a piezoelectric material, a magnetic material, a light emitting diode (LED), or combinations thereof.

10. A method, comprising:
receiving, at a haptic feedback system including a screen with surface modifying components, location data indicative of a location of a ride vehicle along a ride path from a ride controller of an amusement park ride;
converting the location data into tactile information representative of scenery of the amusement park ride associated with the location of the ride vehicle based on a database correlating tactile representations with locations along the ride path; and
recreating the scenery of the amusement park ride at the location on an outer surface of the screen based on the tactile information by activating the surface modifying components of the screen, wherein the surface modifying components are configured to raise or lower portions of the outer surface of the screen.

11. The method of claim 10, comprising tracking the location of the ride vehicle along the ride path using a tracking device.

12. The method of claim 10, wherein the surface modifying components comprise pegs, cells, or both, and wherein each surface modifying component of the surface modifying components is configured to be individually actuated.

13. The method of claim 10, wherein the surface modifying components comprise cells with a fluid disposed therein.

14. The method of claim 13, comprising forming bumps on the outer surface of the screen that are representative of the scenery, wherein forming the bumps comprises expanding the cells with fluid when the cells are actuated.

15. The method of claim 13, comprising forming bumps on the outer surface of the screen that are representative of the scenery, wherein forming the bumps comprises increasing a viscosity of the fluid to expand the cells when the cells are actuated.

16. A haptic feedback system comprising:
a screen configured to be positioned on a ride vehicle and comprising a surface modifying component;
one or more memory devices configured to store a tactile representation of scenery corresponding to location data indicative of the location of the ride vehicle; and
one or more processor devices configured to:
receive the location data;
in response to receiving the location data, determine the tactile representation of the scenery corresponding to the location data from the one or more memory devices; and
output the tactile representation of the scenery corresponding to the location data at the surface modifying component.

17. The haptic feedback system of claim 16, wherein the surface modifying component comprises a plurality of pegs, a plurality of cells, or both, and wherein each peg of the plurality of pegs and each cell of the plurality of cells are individually actuated.

18. The haptic feedback system of claim 16, wherein the surface modifying component comprises a plurality of cells configured to receive a fluid to create bumps on an outer surface of the screen.

19. The haptic feedback system of claim 16, wherein the haptic feedback system is removably coupled to the ride vehicle.

20. The haptic feedback system of claim 16, wherein the ride vehicle comprises a docking station, and wherein the haptic feedback system is configured to couple to the docking station.

\* \* \* \* \*